United States Patent [19]
Doyle et al.

[11] Patent Number: 6,128,738
[45] Date of Patent: Oct. 3, 2000

[54] CERTIFICATE BASED SECURITY IN SNA DATA FLOWS

[75] Inventors: Ronald Patrick Doyle; John Raithel Hind; Julie Hayes King, all of Raleigh, N.C.

[73] Assignee: International Business Machines Corporation, Armonk, N.Y.

[21] Appl. No.: 09/064,632

[22] Filed: Apr. 22, 1998

[51] Int. Cl.[7] .................................................. H04L 9/00
[52] U.S. Cl. ...................... 713/185; 713/183; 713/156; 713/157; 709/229; 709/228
[58] Field of Search ................... 713/185, 183, 713/156, 157; 709/229, 228

[56] References Cited

U.S. PATENT DOCUMENTS

| | | | |
|---|---|---|---|
| 4,471,216 | 9/1984 | Herve | 235/380 |
| 5,005,200 | 4/1991 | Fischer | 380/30 |
| 5,534,855 | 7/1996 | Shockley et al. | 340/825.3 |
| 5,757,920 | 5/1998 | Misra et al. | 380/25 |

OTHER PUBLICATIONS

ITU–T, X.509, Nov. 1993, pp. iii, 1, 3, 6, 13 and 14.
Arnett et al, Inside TCP/IP, Second Edition, 1995, pp. 45–47.
Transport Layer Security Working Group, The SSL Protocol Version 3.0 (Internet Draft).

*Primary Examiner*—Pinchus M. Laufer
*Assistant Examiner*—Jeffrey S. Leaning
*Attorney, Agent, or Firm*—Jeanine S. Ray-Yarletts

[57] ABSTRACT

A method and system for enabling the use of a single client certificate to be used in SNA communications to ensure security such that the certificate cannot be intercepted and reused yet still allowing the use of a single certificate for multiple applications. This avoids the need for a connected trusted third party or a multiplicity of user id and password pairs.

5 Claims, 7 Drawing Sheets

CERTIFICATE BASED SECURITY IN SNA DATA FLOWS

BACKGROUND OF THE INVENTION

Throughout the history of the computing industry security has been a significant issue. Most computer systems employ a user id and password type of verification of a user so that the user can access data within a computer while maintaining a secure environment for computing. The growth in the computer industry and in the amount of information accessible through a computer has also created a proliferation of password requirements. A typical business user has several user identifiers and passwords that they are responsible for. For example, a business user might have a user id and password to gain access to their workstation, another user id and password to gain access to a terminal emulator, another pair to gain access to their electronic mail, yet another user id and password to gain access to their calendaring functions and still a different pair for certain applications. In many instances these passwords are set with expiration dates to improve security which means that each of the passwords will have rules for creating the password (such as 5 alpha-numeric characters with the second character being numeric) and set expiration dates (such as 30 days, 45 days or 60 days). This configuration of computer networking quickly becomes unmanageable since it is extremely difficult to keep all passwords and user ids synchronized, hence many users resort to writing their user ids and passwords on a piece of paper, somewhat eliminating the security benefit intended by the passwords to begin with. Even a personal user of a computer network may be faced with an excess of user id and password requirements such as the user id and password for their Internet provider, one for their mail, another for their travel agent and yet others for each of the bulletin boards to which they subscribe.

A need has arisen in both business and non-business computer use for single sign-on types of products. These products are becoming available in the marketplace today. Most of the products keep a list of all the Ids and map the user from one "single" sign-on to the appropriate user id/password pair for their destination, so that the user id/password changes in the data stream transparently to the user. However, this approach requires significant administrative effort to prime the database with the correct user id/password pairs and requires synchronization of the password databases as passwords change or expire.

An additional method is to use a trusted third party to authenticate users and to have all of the users authenticated through this trusted third party. Two overviews of the current state of the art for single sign-on products utilizing trusted third parties are HP and Partners Collaborate on Presidium/Single Sign-on: Single Log-in Solution Simplifies and Safe-guards User Log-in for UNIX System, NT, MVS and other Platforms; Deloitte & Touche, DunaSoft, Entrust Technologies, Gradient, Sybase and Texis Instruments part of Presidium Solution; Jan. 27, 1997 found on the world wide web at http://www.hp.com/csopress/97jan27b.html and Open Horizon's White Paper entitled Secure Single Sign-On found on the world wide web at http://www.openhorizon.com/html/sssowp.html.

The above solutions allow for a single sign-on for certain applications but require a trusted third party to be connected or a non-public key token which must be handled on the target system.

SUMMARY OF THE INVENTION

The present invention allows a single client certificate to be used across multiple systems when SNA (systems network architecture) is part of the transport between the client and the host or server system. It enables a unique security packet to be generated, that cannot be reused by others, wherein the security packet allows a certificate to be passed in the SNA flows for the authentication of a user. A certificate is an electronic statement of identity that allows building of a trust relationship between parties wishing to exchange information using a preexisting trust relationship that each of the parties has with a third party. The present invention is applicable to both a two tier environment where an SNA client is talking through the network to an SNA host or in a multi-tier environment where the client accesses one or more middle tier servers to gain access to the SNA host. The present invention enables certificate based authentication without the requirement of an active trusted third party.

OBJECTS OF THE INVENTION

An object of the present invention is to enable the use of public key technology to provide secure access over SNA sessions thereby reducing the user id/password requirements for access to secure applications.

Yet another object of the present invention is to enable secure access over SNA using public key technology in a three tier configuration where traffic flows from the workstation, through a gateway, to the host.

DETAILED DESCRIPTION OF THE PREFERRED EMBODIMENT

The present invention provides a method, system and program product for integrating the security requirements of SNA sessions with additional security mechanisms to enable a user to reduce the number of security credentials that must be managed without introducing the overhead of additional password management. This is done by using public key technology as a replacement for the current user id and password requirement in SNA communications. The present invention also takes advantage of the move toward using certificates for providing a global identity.

The present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, magnetic storage devices, or computer memory.

The preferred embodiment of the present invention centers on the creation of a security packet at either the client in the 2-tier case or the middle tier server in the 3-tier case. The security packet contains the X.509 certificate (as will be obvious to those skilled in the art, any commonly accepted certificate could be used but the X.509 certificate is the industry standard) of the user which is used by the host as a replacement for the user id and a digital signature which is used by the host as a replacement for the password. The key elements to ensuring the security of the system are a method of preventing replay of the SNA session containing the packet without introducing a handshake type protocol in addition to a packet format that does not require host understanding of the tiers or layers of its SNA session partner.

The basic concept and benefit of using certificates and public key encryption is that there exist algorithms in which certain key pairs allow a message to be encrypted with one key and decrypted with a different key. For example, two users A and B each have a public key which is known to everyone and a private key, which only they know. If A wants to send B a secure message, A would encrypt the message using this algorithm and B's public key. In this case B would be the only one who could read the message since B's private key is required for the decryption and only B knows his private key. Therefore A can send B a secure message without requiring a third party to get involved for security verification.

Figure 4:
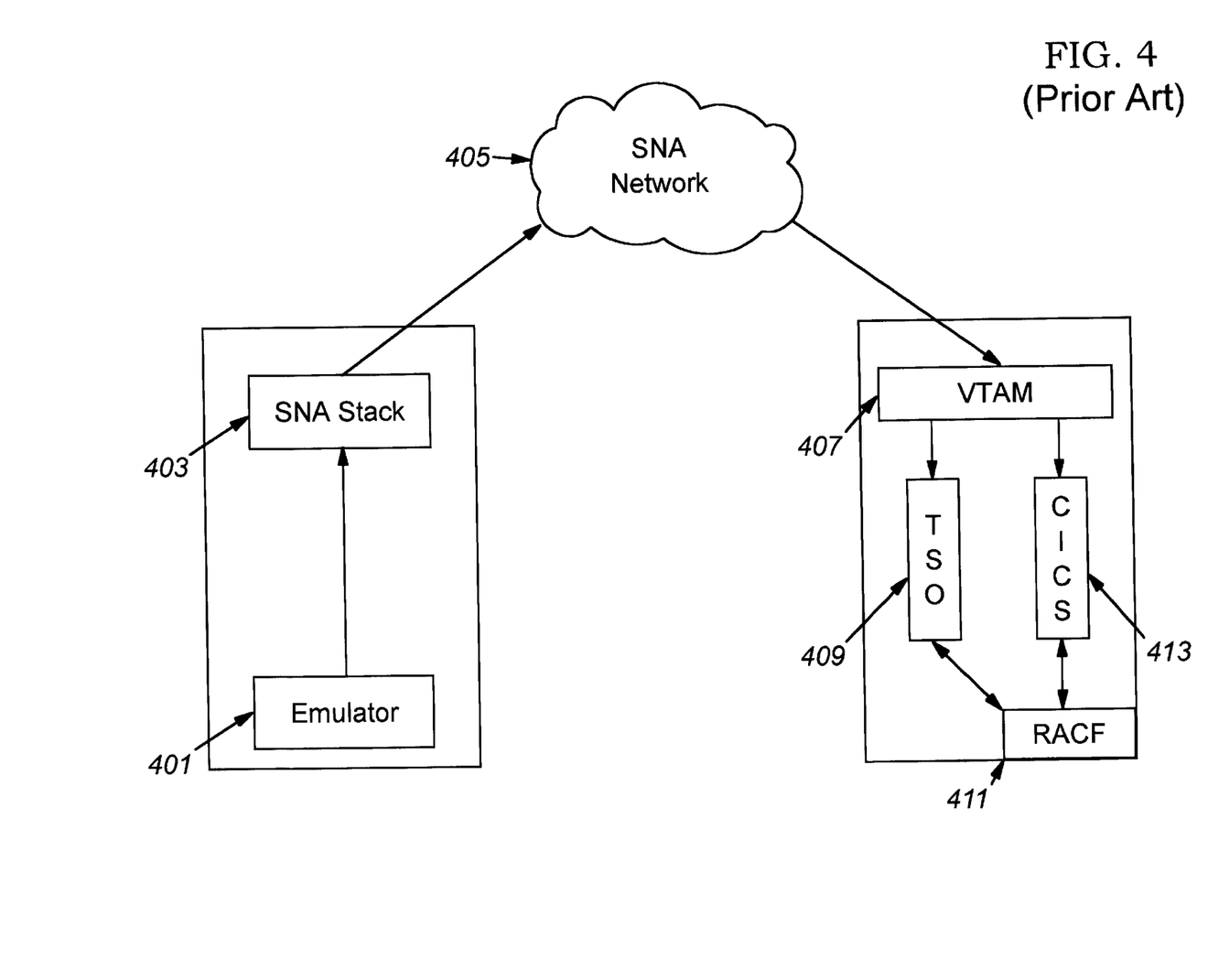
FIG. 4 is a pictorial representation of the prior art user id and password verification through an SNA network.
Figure 5:
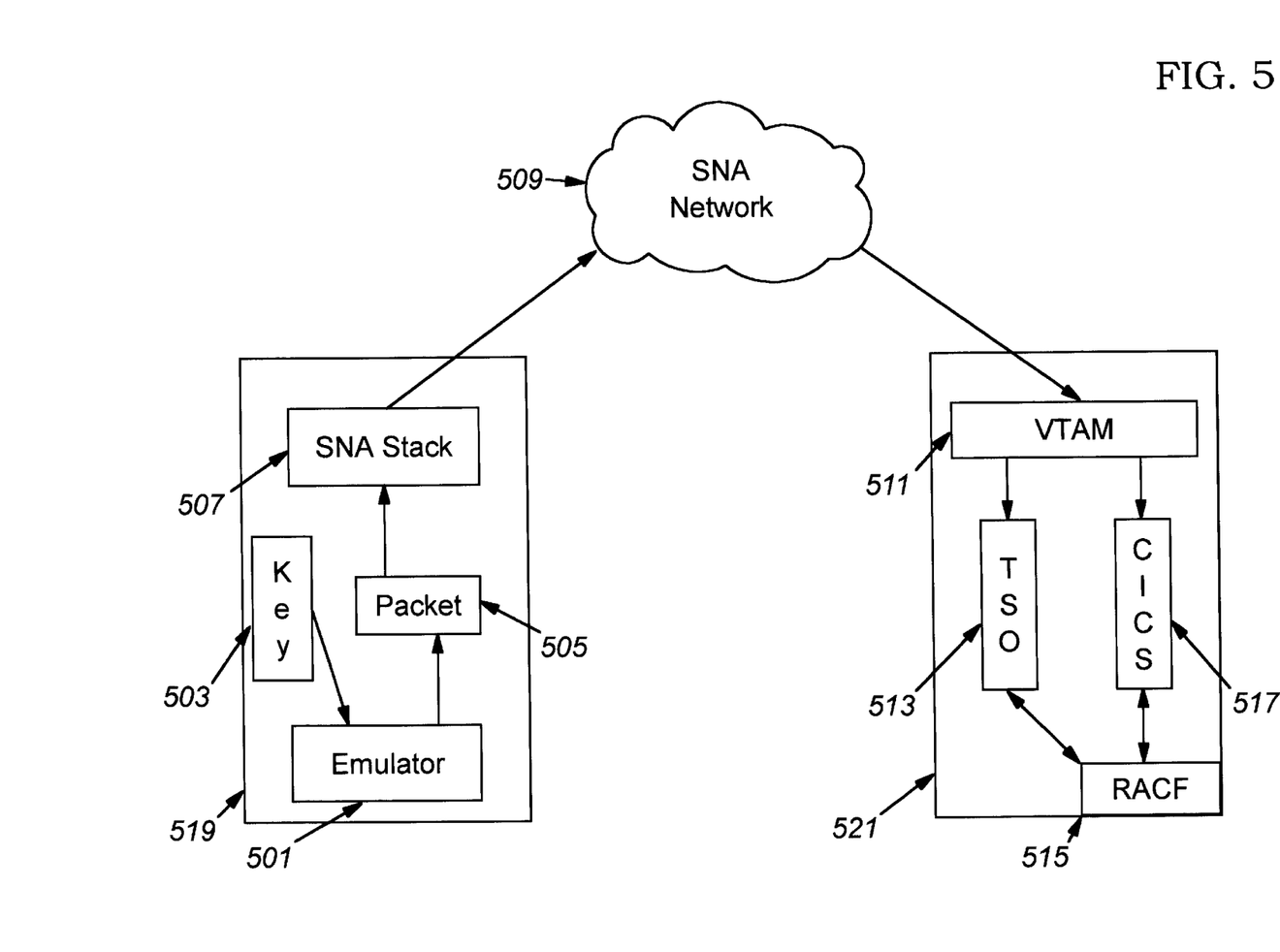
FIG. 5 is a pictorial representation of the two tier authentication of the present invention.

A preferred embodiment of the present invention would be that of a user running through an emulator, over an SNA network to a host system where the user was attempting to execute a host application such as TSO. In the current art, as shown in FIG. 4, the user utilizes their emulator 401 and submits a logon request to the host through the SNA stack 403. The user provides their TSO user id and their TSO password with the logon request. This user id and password are sent across the SNA network 405 from the emulator 401 to RACF 411 for password verification. If RACF 411 verifies the user id and password, then the user is allowed to execute the TSO 409 commands. If that same user wants to execute CICS 413 commands, they are required to provide their CICS user id and their CICS password, have those passwords verified by RACF 411, then they are allowed to execute CICS 413 commands over that session. Utilizing the present invention as depicted by FIG. 5, the user logs on to the emulator 501. When the user logs on to the emulator 501, the user chooses their certificate from their certificate key ring 503. The key ring may be accessed through the well known crypto framework or other provided security services. When the user proceeds to access TSO 513, the emulator creates an encrypted security packet 505 containing a certificate, a token, a token signature and the certificate chain of the signer. In the two-tier example being presented, the signature is created using the end-user's private key. The token within the packet contains the end users X.509 personal certificate, a time/date stamp, plus the SNA session ID on which the packet will be transmitted. Incorporating the SNA session ID into the packet ensures that a person monitoring or tracing the communication could not reuse the security packet to gain access to the information. If an intruder would attempt to reuse the security packet, the session ID would not be correct and the access attempt would fail. The time/date stamp further limits the use of the security packet and provides additional audit information should the administrator choose to log connection events. The token signature of the preferred embodiment is an X.509 signature algorithm type code (for example RSA+ MD5, RSA+SHA, or DSS which are well known in the art). Once the security packet is created it is passed through the SNA stack 507 to the SNA network 509 along with the request to access TSO 513. On the receiving side of the SNA network 509, VTAM 511 retrieves the packet, verifies the signature and checks the session ID to ensure that the packet is not from an unauthorized source. If the session ID is for the session upon which the packet was received, then VTAM passes the information to RACF 515 for verification of the authority of the user. If the user requesting access has the appropriate credentials (ie. RACF trusts the signer) then RACF 515 approves the access to the resources allowed for the stated certificate and the user is permitted to execute the TSO 513 commands; otherwise the request is rejected.

This same series of steps occurs when the user attempts to access CICS 517 or any other secure system on the remote host, but RACF 515, under the present invention is looking at the same user certificate information rather than, in the prior art, having the user utilize a different user id and password for each of the secure systems which the user desired to access.

Figure 6:
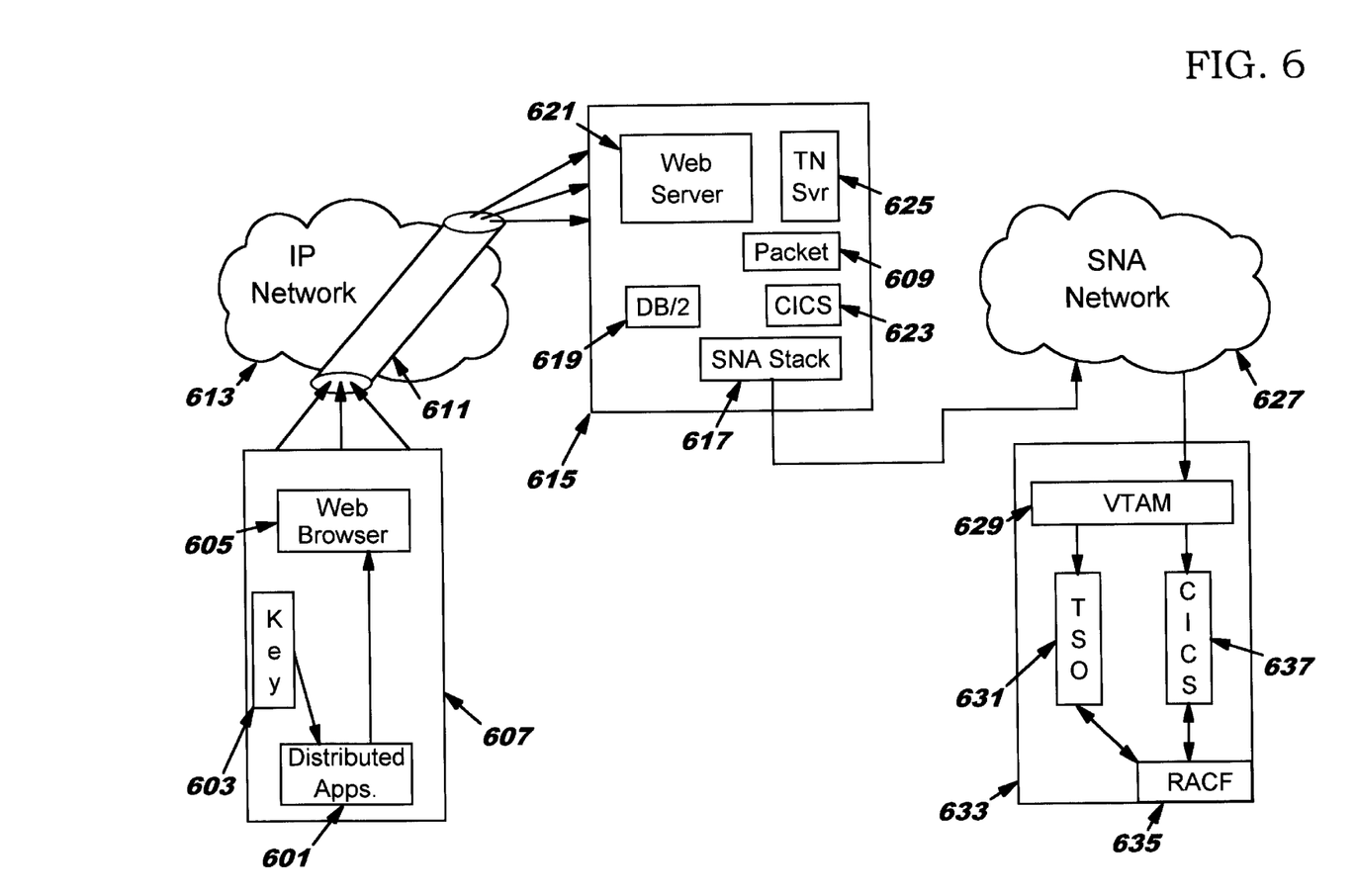
FIG. 6 is a pictorial representation of the three tier authentication of the present invention.

A second embodiment of the present invention is a three-tier embodiment where the user accesses the SNA network through an IP/SNA gateway. This is depicted in FIG. 6. In the embodiment of FIG. 6, a user at a remote system 607 accesses a secure host application such as TSO 631 or CICS 637 by going from the remote system 607, through an IP network 613 to a gateway system 615. The path 611 through the IP network 613 which the information takes in traveling from the user to the gateway utilizes Secure Sockets Layer (layer) which provides compression, encryption and public key authentication so that the information sent across this channel is secure from tampering or tracing by unauthorized users. In the gateway, the application managing the communication (such as the telnet server 625) creates the security packet 609 of the previous embodiment. The security packet of the three-tier embodiment contains the same information as that of the two-tier embodiment except in the two-tier embodiment the token is signed by the end user's private key and in the three-tier embodiment the token is signed by the private key of the application which retrieved the certificate. The information next travels from the gateway 615 through an SNA network 627 to the host computer 633. At the host computer 633 VTAM 629 receives the information, verifies the signature and verifies that the session ID encrypted within the token is the same as the session id from which the token came. If it is, then VTAM passes information such as the certificate to RACF 635 for verification. If RACF 635 determines the packet signer was a trusted delegate then it knows that the user certificate was validated at the mid-tier (SSL in this case) and then the user is allowed to access the secure applications such as TSO 631 or CICS 637. If RACF 635 determines that the certificate is not from a trusted party then the session is rejected.

Figure 2:
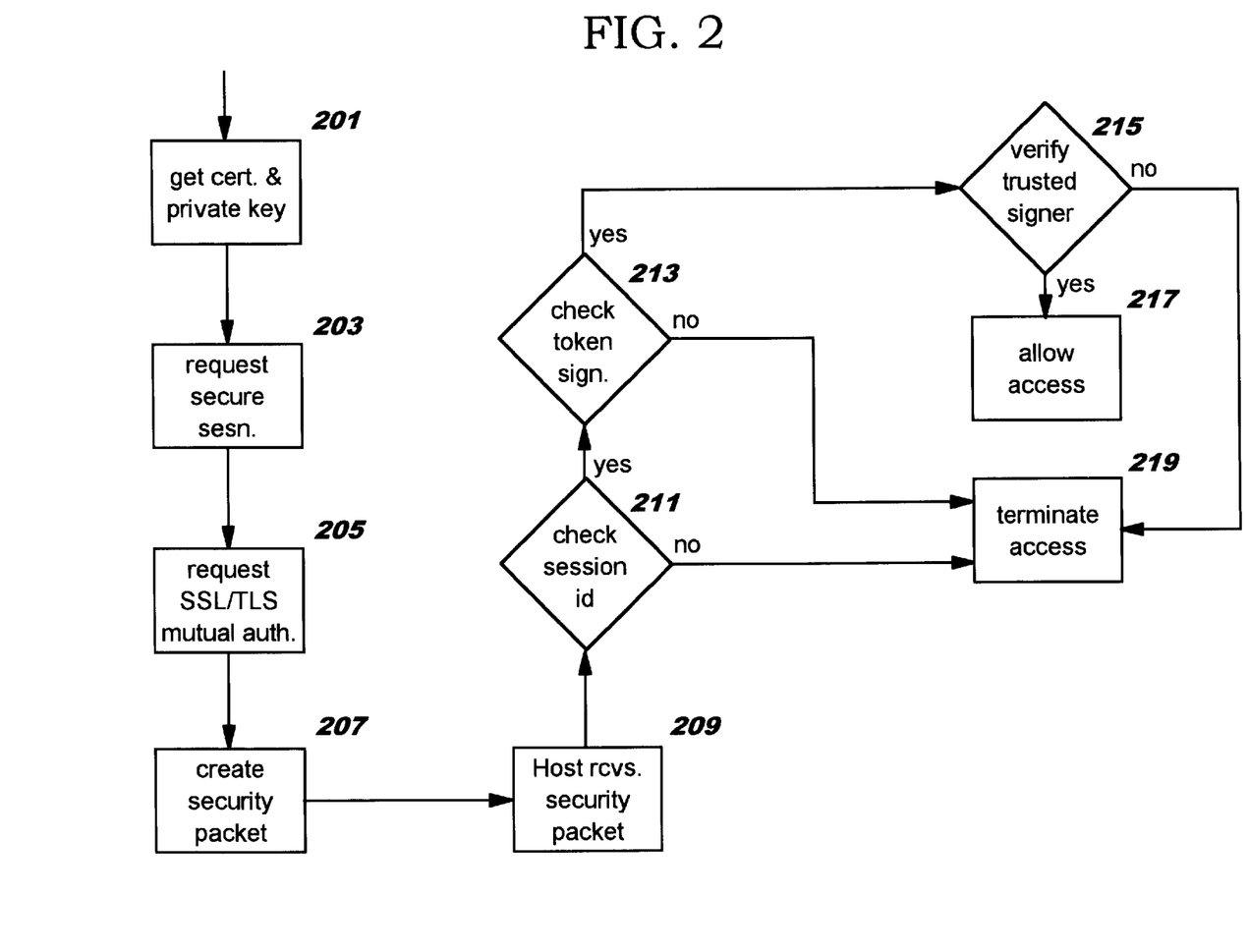
FIG. 2 is a flow chart depicting the sign-on validation in a three tier embodiment of the present invention.

FIG. 2 depicts a flow chart of the three-tier authentication of FIG. 6. At 201 the user obtains a certificate which, along with their private key, is saved on a personal key-ring that is available to the client emulator (and its SSL implementation). Ideally this is the same certificate and key-ring used by the browser, e-mail client, file/print redirectors and other secure applications to identify the user to a server. At 203 the user requests a secure session. The emulator requests, at 205, SSL/TLS mutual authentication to be used in building the TN session with the communications server. Once the SSL/TLS process succeeds in establishing a channel to the communications server, the user's certificate is available to the intermediate server and the server can trust the value therein. At 207, the server uses the user's certificate and creates a security packet for the SNA session between itself and the host. In doing so, the intermediate server is assuring the host that the user certificate was derived from an SSL/TLS channel whose server side library used a signer's key-ring which contained only certificate authorities which the host trusts. This means that the delegation of authentication responsibility to the communications server is represented by the configured content of the signer's key-ring and the assurance that the server software will use the information via SSL/TLS to validate the user's certificate submission. At 209 the host receives the security packet, at 211 a verification is done to ensure that the session id included in the token matches the session id that the packet arrived on. If the verification fails, the session is terminated 219. If the session ids match, then at 213 a check is made to validate the token signature using the algorithm indicated to verify that the token has not been tampered with. Methods of determining tampering are well known in the art and are not unique or pertinent to the present invention, therefore they will not be discussed further at this point. If the token shows evidence of tampering the session is terminated 219. If the session has not been tampered with then at 215 the host verifies via the certificate chain that it trusts the signer. If the signer's certificate is not the certificate in the token, the host verifies that the signer is in the delegation list of those trusted to enforce the authentication rules. If the signer is not trusted then the session is terminated 219, otherwise access is permitted 217.

Figure 1:
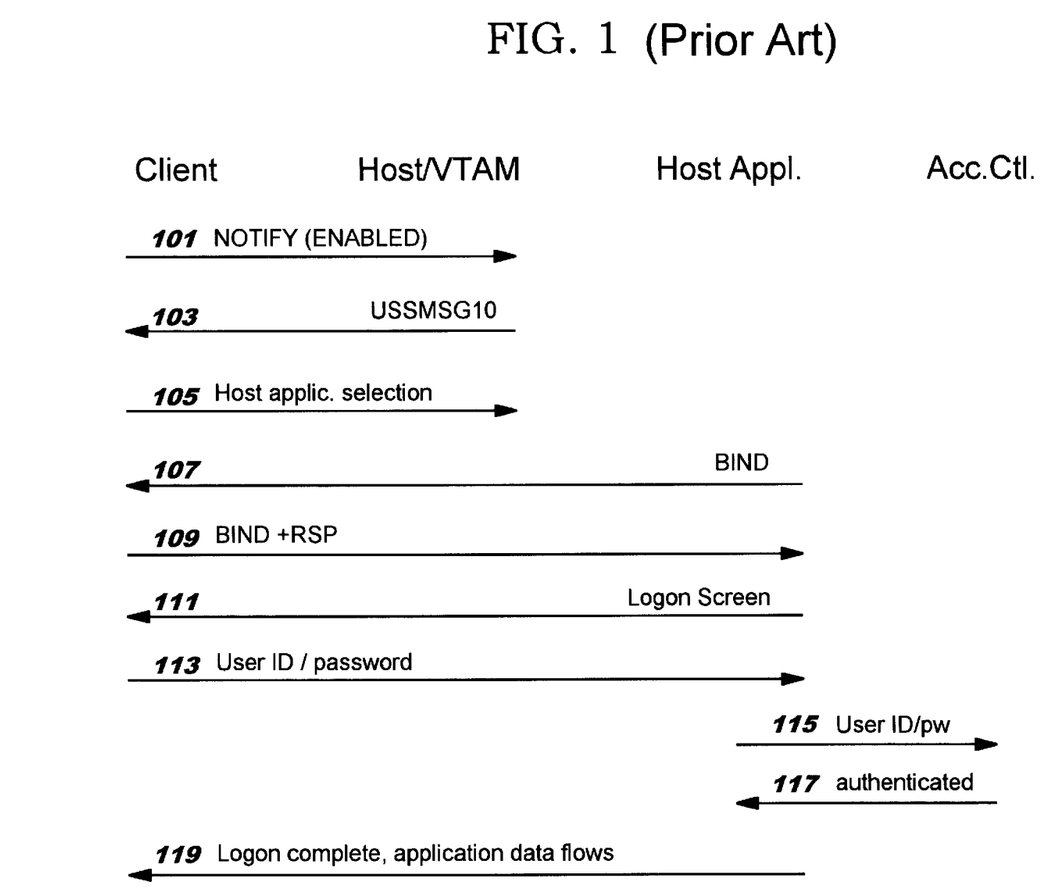
FIG. 1 is a flow diagram of the current sign-on and validation in a SNA environment (Prior Art).
Figure 3:
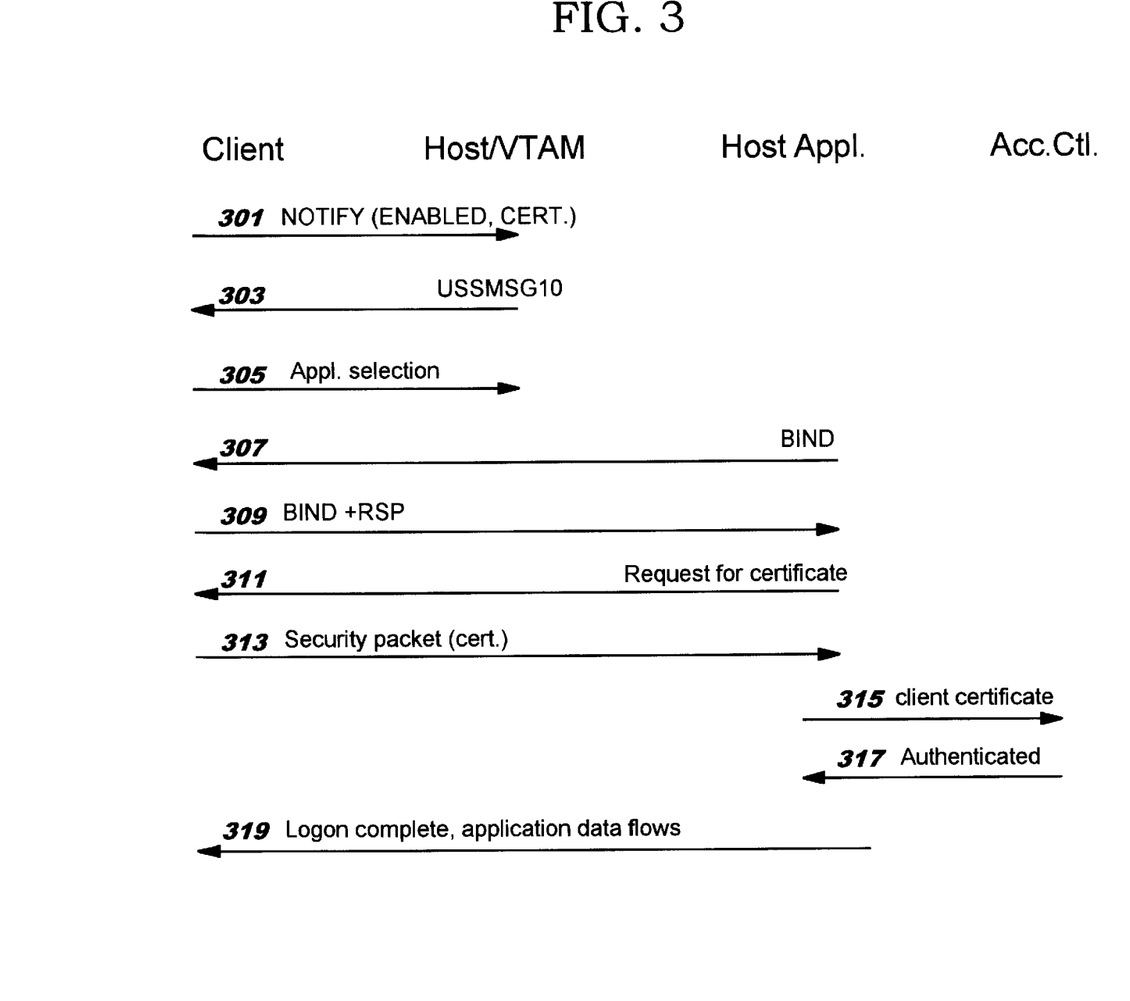
FIG. 3 is a flow diagram of the user validation of the present invention.

As for the flows that actually travel between the client and the host, FIG. 1 is an example of the high level flows that travel between the client and the host in the prior art. FIG. 3 is an example of the high level flows that travel between the client and the host in a preferred embodiment of the present invention.

In FIG. 1 the client initiates the session with the host by sending a NOTIFY (ENABLED) 101 to VTAM on the host. The VTAM host responds by sending a USSMSG10 103 to the client. The client completes the screen sent down as USSMSG10 which contains a host application selection 105 and transmits it to the host. When the host receives the information about which host application is selected, the host application provides the information and a bind request 107 is sent from the host to the client. The client responds with a bind response 109. The host application then initiates the sending of a logon screen 111 to the client. In the prior art, the logon screen is sent as a 3270 data stream. The client then responds by providing the user id and password 113 and transmitting that information to the host for authentication. The user id and password are then sent by the host applications to the host access control application (such as RACF) 115. The host access control next authenticates the user id/password pair 117 and returns information to the host application. At that point, the logon is complete and application data begins to flow 119 between the client and the host application. This happens for each secure application which the client attempts communication with.

In FIG. 3 the client initiates the session with the host by sending a NOTIFY (ENABLED, CERTIFICATE CAPABLE) 301 to VTAM on the host which requests the connection and indicates to the VTAM host that the client can provide a certificate for authentication. The VTAM host responds by sending a USSMSG10 303 to the client. The client completes the screen sent down as USSMSG10 which contains a host application selection 305 and transmits it to the host. When the host receives the information about which host application is selected, the host application provides the information and a bind request 307 is sent from the host to the client. The client responds with a bind response 309. The host application then sends a request to the client for their certificate 311. In the preferred embodiment, the request for the client's certificate is sent as a 3270 data stream. The client then responds by creating the security packet as previously described and sending the security packet to the host 313 for authentication. The host application forwards the client's certificate to a host access control 315 such as RACF. The host access control returns a response to the host application 317. At that point, the logon is complete and application data begins to flow 319 between the client and the host application.

Figure 7:
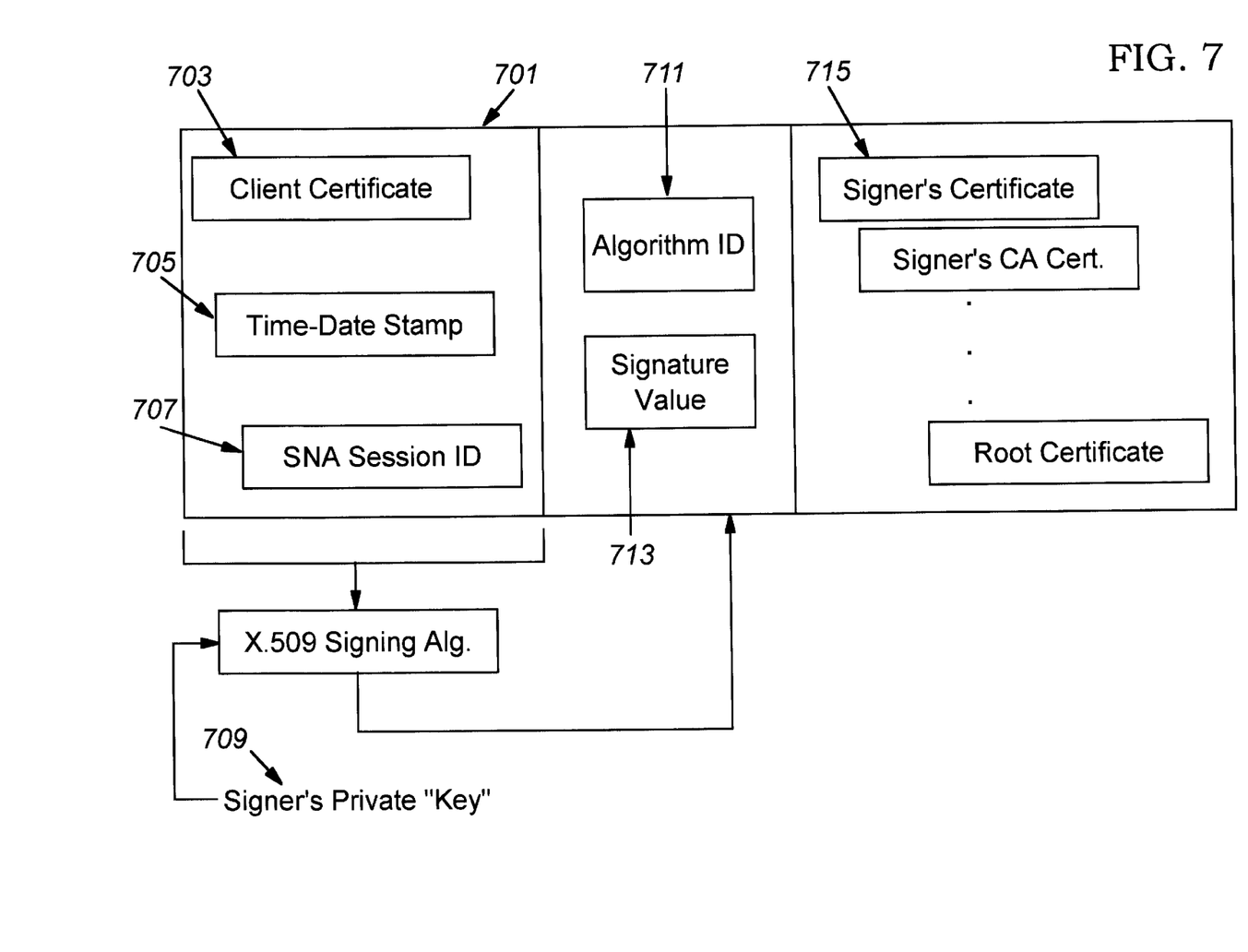
FIG. 7 is an exemplary layout of an SNA security packet of the present invention.

FIG. 7 depicts the layout of the SNA security packet in the preferred embodiment. First the client certificate 703, the time and date stamp 705 and the SNA session id 707 for the session upon which the packets will be transmitted are compiled into a message 701. This message is then signed using a signing algorithm and the signer's private key 709. To sign the message, the application would hash the message (a digest generated by passing the message through a one-way cryptographic function) into a relatively short bit string using a security algorithm such as SHA, MD2, MD4 or MD5. The application would then encrypt the hashing using the signer's private key with the public key algorithm. The resulting signature 713 would then be attached to the rest of the message. The rest of the message contains the algorithm id 711 for the algorithm used and the series of certificates 715 of the signers and the authenticating certificate authorities. Note that the user and signer are not the same in a three-tier environment which is why the signer's certificate is included. The certificate authority (CA) certificate is used to verify that the signer's certificate has not been modified (the CA is the signer of the signer's certificate). This verification proceeds until a CA certificate is found that is known to the receiving system by some other means (such as being defined by an administrator). Note that the signature algorithm is a description of the kind of digest and the kind of encryption being used. The SNA security packet is then transmitted to the host.

The present invention allows a single, well recognized certificate to access secure applications without the requirement of having a connected trusted third party for verification of authority.

The preferred embodiment shows the application of this method to SNA logical unit (LU) types 0–2 using 3270 data streams. This method is not limited to LU types 0–2 and applies equally to SNA LU 6.2 communications. For supporting LU 6.2, the security packet is sent rather than the userid/password. The LU6.2 ATTACH command would indicate support for certificate security, and the previously described packet would be sent following the ATTACH (and subsequent program initialization data, if any). The receiving SNA systems would again perform checks to ensure the packet arrived on the session matching the session id in the packet as in the previous description.

What is claimed is:

1. A computer program for execution on a first computer system having a communications session established with one or more second computer systems, said computer program comprising the steps of:

a first subprocess for identifying a token and a token signature for a computer user having a certificate;

a second subprocess for identifying a certificate chain for said computer user;

a third subprocess for creating a communications packet having at least said token, said token signature and said certificate chain;

a fourth subprocess for sending said communications packet across said communications session from said first computer to said one or more second computer systems; and a fifth subprocess wherein said one or more second computer systems verify the authority of said user to access data on said one or more second computer systems using said communications packet wherein said token comprises said computer user's certificate plus said session identifier for the session on which said packet will be transmitted.

2. A method for controlling access by a client to one or more host applications, said one or more host applications residing on one or more hosts, said method comprising the steps of:

creating a token representing said client, said token comprising at least a client certificate and a session id;

signing said token using a signer's private key;

sending said token over a session with said one or more host applications, said session having a session id, wherein said one or more hosts receive said token, verify said signature on said token, and verify said session id within said token is the same as the session id for the session upon which the token was received and rejecting the session if the session id was not for the session upon which the token was received.

3. A method as claimed in claim 2 wherein an intermediate TCP/IP network resides between the client and the one or more hosts.

4. In a computer system, an apparatus for controlling access by a client to one or more host applications, said one or more host applications residing on one or more hosts, said apparatus comprising:

means for creating a token representing said client, said token comprising at least a client certificate and a session id;

means for signing said token using a signer's private key;

means for sending said token over a session with said one or more host applications, said session having a session id, wherein said one or more hosts receive said token, verify said signature on said token, and verify said session id within said token is the same as the session id for the session upon which the token was received, rejecting the session if the session id was not for the session upon which the token was received.

5. An apparatus as claimed in claim 4 wherein an intermediate TCP/IP network resides between the client and the one or more hosts.

* * * * *